United States Patent [19]
Thomas et al.

[11] Patent Number: 5,823,703
[45] Date of Patent: Oct. 20, 1998

[54] SHAFT COUPLING

[75] Inventors: Steven Mark Thomas, Saginaw; Kevin Carlton Ross, Hemlock; Michael Francis Slasinski, Saginaw, all of Mich.

[73] Assignee: General Motors Corporation, Detroit, Mich.

[21] Appl. No.: 866,792

[22] Filed: May 30, 1997

Related U.S. Application Data

[63] Continuation-in-part of Ser. No. 767,741, Dec. 17, 1996, abandoned.

[51] Int. Cl.$^6$ .................................................. F16B 2/10
[52] U.S. Cl. ........................... 403/373; 403/328; 403/338; 464/182; 464/901; 74/492
[58] Field of Search .................................... 403/373, 359, 403/327, 328, 326, 338, 335, 336, 221, 222; 285/318; 464/901, 182, 134, 81; 74/492

[56] References Cited

U.S. PATENT DOCUMENTS

| | | | |
|---|---|---|---|
| 2,084,431 | 6/1937 | Catley | 285/168 |
| 2,303,031 | 11/1942 | Dusevoir | 403/338 X |
| 3,218,095 | 11/1965 | Wiltse | 285/318 |
| 3,744,577 | 7/1973 | Williams | 464/901 X |
| 3,922,011 | 11/1975 | Walters | 285/277 |
| 4,401,326 | 8/1983 | Blair | 285/318 |
| 4,453,449 | 6/1984 | Hollmann | 89/1.806 |
| 4,641,990 | 2/1987 | Geisthoff | 403/317 |
| 4,645,372 | 2/1987 | Suzuki | 403/325 |
| 4,763,470 | 8/1988 | Brown | 403/336 X |
| 4,805,943 | 2/1989 | Balsells | 403/326 X |
| 4,906,122 | 3/1990 | Barrett et al. | 403/305 |
| 4,943,188 | 7/1990 | Peppel | 405/224 |
| 4,957,387 | 9/1990 | Nasu | 403/322 |
| 5,425,558 | 6/1995 | Dennany, Jr. | 285/318 X |
| 5,536,047 | 7/1996 | Detable et al. | 285/39 |

*Primary Examiner*—Harry C. Kim
*Attorney, Agent, or Firm*—Dean L. Ellis; Saul Schwartz

[57] ABSTRACT

A shaft coupling including a socket, a first shaft, a plug on a second shaft seated in the socket, and a clamp operative to clamp together the first and the second shafts in the direction of a longitudinal centerline of the shaft coupling to prevent dislodgment of the plug from the socket. The clamp includes an annular first flange on the first shaft, an annular second flange on the second shaft facing the first flange, oppositely facing frustoconical shoulders on the first and the second flanges, a plurality of clamp jaws pivotally mounted on the first shaft arrayed symmetrically around the first and the second flanges each having a closed position inducing radial thrust on the oppositely facing frustoconical shoulders, and springs biasing each of the clamp jaws toward its closed position. The oppositely facing frustoconical shoulders convert the radial thrust of the clamp jaws into linear thrust in the direction of the longitudinal centerline of the shaft coupling to force together the annular first and second flanges. A peripheral edge of the annular second flange pivots the clamp jaws to open positions against the bias of the springs to permit completion of the shaft coupling in quick-connect fashion.

8 Claims, 6 Drawing Sheets

SHAFT COUPLING

CROSS-REFERENCE TO RELATED APPLICATION

This is a continuation-in-part of U.S. Ser. No. 08/767,741, filed Dec. 17, 1996 and assigned to the assignee of this invention, now abandoned.

TECHNICAL FIELD

This invention relates to a shaft coupling.

BACKGROUND OF THE INVENTION

Motor vehicle steering systems commonly include a steering gear mounted on one part of the vehicle, a steering column mounted on another part of the vehicle, and an intermediate steering shaft bridging the gap between an input shaft of the steering gear and a steering shaft of the steering column. The intermediate steering shaft typically has universal joints at its opposite ends and is installed after the steering column and the steering gear by coupling a yoke of each universal joint to a corresponding one of the steering gear input shaft and the steering shaft. Such couplings usually consist of a longitudinally split tubular sleeve on the yoke, a pair of lugs on the tubular sleeve, and a pinch bolt which squeezes the lugs together to circumferentially clamp the split sleeve on the end of the corresponding one of the steering gear input shaft and the steering shaft. A shaft coupling according to this invention is a novel alternative to the shaft coupling defined by the aforesaid split tubular sleeve and pinch bolt.

SUMMARY OF THE INVENTION

This invention is a new and improved shaft coupling between a first shaft and a second shaft including a socket in one of the first and the second shafts, a plug on the other of the first and the second shafts seated in the socket to couple the first and the second shafts for unitary rotation, and a clamp operative to clamp together the first and the second shafts in the direction of a longitudinal centerline of the shaft coupling to prevent dislodgment of the plug from the socket. The clamp includes an annular first flange on the first shaft, an annular second flange on the second shaft facing the first flange, oppositely facing frustoconical shoulders on the first and the second flanges, a plurality of clamp jaws pivotally mounted on the first shaft arrayed symmetrically around the first and the second flanges each having a closed position inducing radial thrust on the oppositely facing frustoconical shoulders, and a spring biasing each of the clamp jaws toward its closed position. The oppositely facing frustoconical shoulders convert the radial thrust of the clamp jaws into linear thrust in the direction of the longitudinal centerline of the shaft coupling to force together the annular first and second flanges. A peripheral edge of the annular second flange pivots the clamp jaws to open positions against the bias of the spring to permit completion of the shaft coupling in quick-connect fashion.

DESCRIPTION OF THE PREFERRED EMBODIMENT

Figure 1:
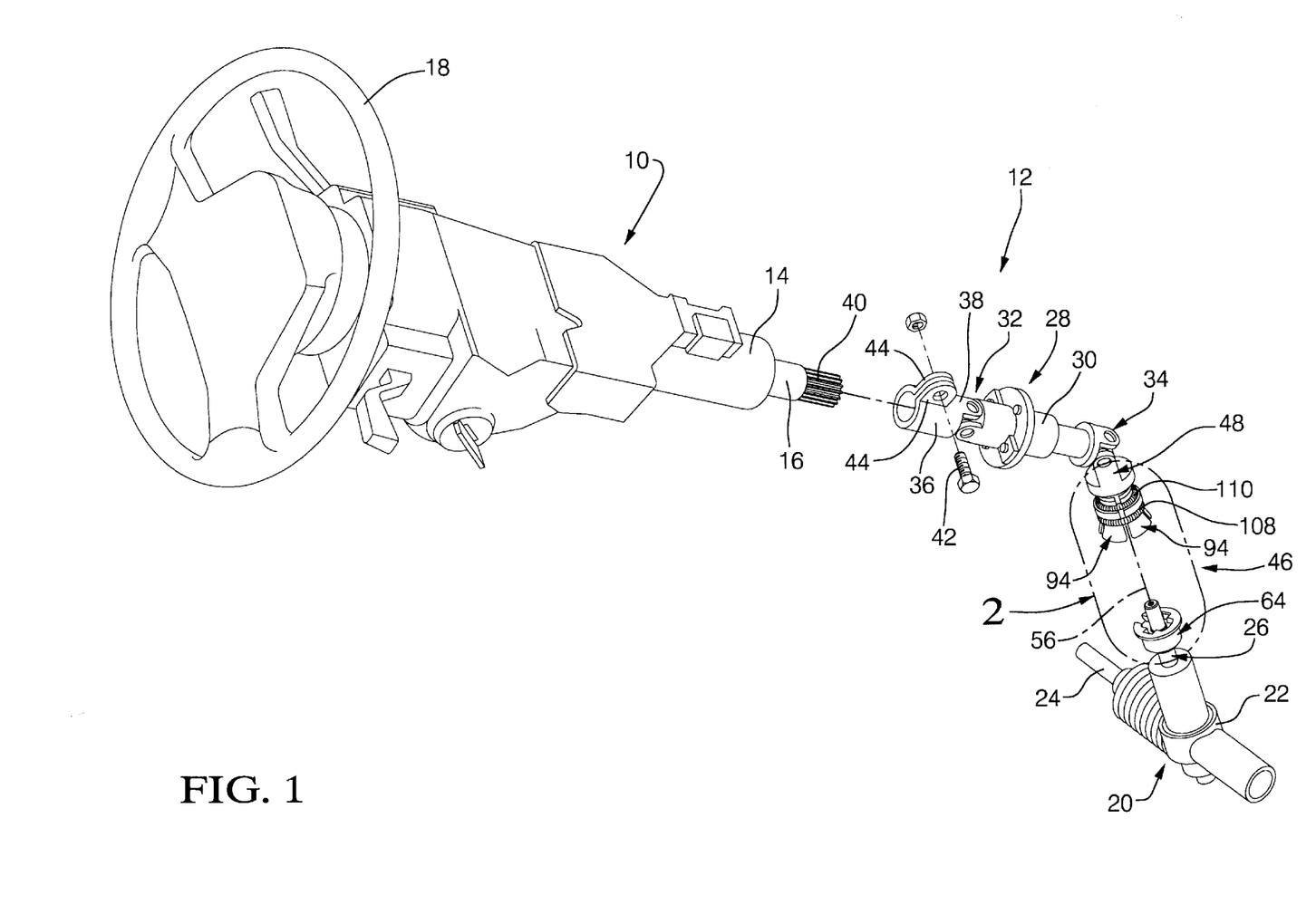
FIG. 1 is a fragmentary perspective view of a motor vehicle steering system having therein a shaft coupling according to this invention.
Figure 2:
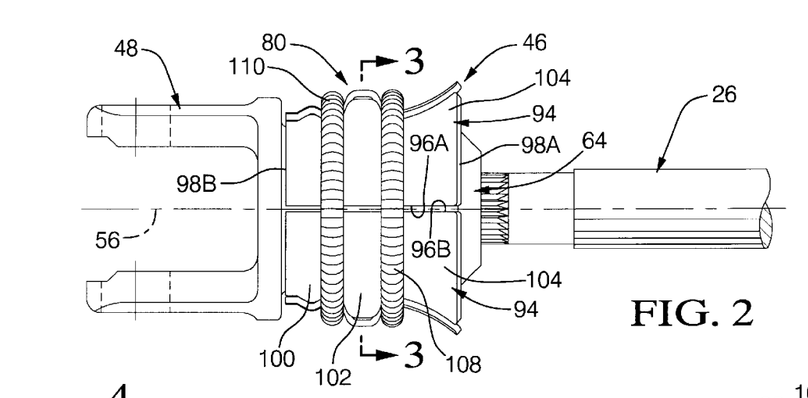
FIG. 2 is an enlarged view of a portion of FIG. 1 identified by the reference circle 2 in FIG. 1.
Figure 3:
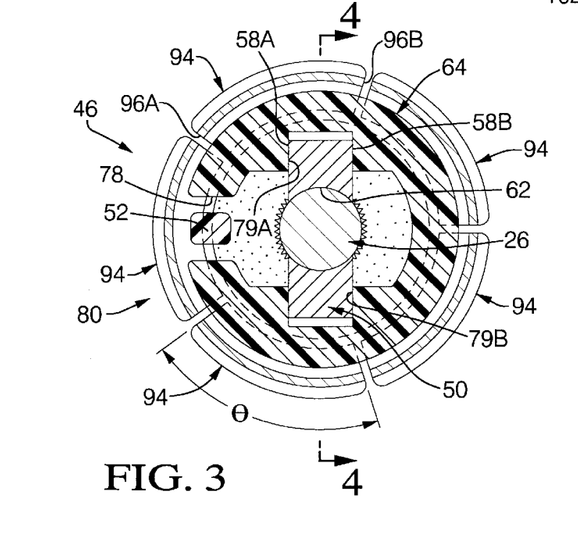
FIG. 3 is a sectional view taken generally along the plane indicated by lines 3—3 in FIG. 2.

Referring to FIG. 1, a steering column 10 of a motor vehicle steering system 12 includes a housing 14 attached to a body structure, not shown, of the motor vehicle, a steering shaft 16 rotatably supported on the housing 14, and a steering wheel 18 rotatable as a unit with the steering shaft. A steering gear 20 of the steering system 12 includes a housing 22 mounted on the vehicle remote from the steering column, a rack bar 24 linked to steered wheels, not shown, of the motor vehicle such that back and forth linear translation of the rack bar in the housing 22 steers the vehicle in conventional fashion, and an input shaft 26 rotatably supported on the steering gear housing.

An intermediate steering shaft 28 of the steering system 12 bridges the gap between steering shaft 16 and the steering gear input shaft 26 and includes a shaft portion 30, a first universal joint 32 at one end of the shaft portion, and a second universal joint 34 at the other end of the shaft portion. The intermediate steering shaft is coupled to the steering shaft 16 by a longitudinally split sleeve 36 integral with a yoke 38 of the first universal joint 32 which is clamped onto an end 40 of the steering shaft 16 by a pinch bolt 42 which squeezes together a pair of lugs 44 on the split sleeve. The intermediate steering shaft 28 is coupled to the steering gear input shaft 26 by a shaft coupling 46 according to this invention between the steering gear input shaft and a yoke 48 of the second universal joint 34.

Referring to FIGS. 2–4 and 6, the shaft coupling 46 includes a plug 50 and an orientation lug 52 on an end wall 54 of the yoke 48. The end wall 54 is disposed in a plane perpendicular to a longitudinal centerline 56 of the shaft coupling. The plug 50 has a pair of beveled sides 58A, 58B and is interrupted by a bore 62 through the yoke 48 symmetric about the centerline 56. An adapter 64 of the shaft coupling 46 is rigidly attached to the steering gear input shaft 26 inboard of a distal end 66 of the latter. An end wall 68, FIG. 6, of the adapter is disposed in a plane perpendicular to the longitudinal centerline 56 of the shaft coupling.

A cylindrical pilot 70 on the steering gear input shaft 26 between its distal end 66 and the end wall 68 of the adapter 64 is disposed in the bore 62 in the yoke 48. A rectangular socket 72 of the shaft coupling 46 in the end wall 68 of the adapter 64 receives the plug 50 with the beveled sides 58A, 58B of the plug wedged against a pair of beveled sides 74A, 74B of the socket to eliminate angular lash between the plug and the socket. The orientation lug 52 on the end wall 54 of the yoke 48 seats in an orientation slot 78 in the end wall 68 of the adapter. The plug 50 and the socket 72 cooperate in coupling the yoke 48 to the steering gear input shaft 26 for unitary rotation about the centerline 56 of the shaft coupling.

A clamp 80 of the shaft coupling 46 operative to prevent dislodgment of the plug 50 from the socket 72 includes an annular first flange 82 on the yoke 48 and an annular second flange 84 on the adapter 64. The first flange 82 has a flat face 86 in the plane of the end wall 54 of the yoke and a frustoconical shoulder 88. The second flange 84 has a flat face 90 in the plane of the end wall 68 of the adapter 64 facing the flat face 86 on the first flange 82 and a frustoconical shoulder 92 facing in the opposite direction from the frustoconical shoulder 88 on the first flange.

The clamp 80 further includes a plurality of identical clamp jaws 94 arrayed symmetrically around the annular first and annular second flanges 82, 84. Each clamp jaw 94 is arc-shaped in lateral cross section, i.e., the cross section of the clamp jaw in a plane perpendicular to the centerline 56 of the shaft coupling 46, and includes a pair of longitudinal edges 96A, 96B, a pair of lateral edges 98A, 98B, a first lateral undulation 100 adjacent the lateral edge 98B, a second lateral undulation 102, and an outwardly flared lip 104 between the second lateral undulation and the lateral edge 98A. Each clamp jaw 94 covers an angular segment θ, FIG. 3, of the circumferences of the juxtaposed annular flanges 82, 84. The second lateral undulation 102 of each clamp jaw 94 has a pair of side walls 106A, 106B inclined to match the inclinations of the oppositely facing frustoconical shoulders 88, 92 on the annular first and second flanges 82, 84, FIG. 4.

An annular first spring 108 is stretched around all of the clamp jaws 94 and seated in a circumferential trough defined at the intersection between the flared lip 104 and the second lateral undulation 102 of each clamp jaw 94. An annular second spring 110 is stretched around all of the clamp jaws 94 and seated in a circumferential trough defined between the second lateral undulation 102 and the first lateral undulation 100 of each clamp jaw 94. The annular springs 108, 110 cooperate in biasing each of the clamp jaws 94 radially inward relative to the centerline 56 of the shaft coupling 46 to a closed position, FIGS. 2–4, in which the side walls 106A, 106B of the second undulation bear against the frustoconical shoulders 88, 92, respectively, on the annular flanges 82, 84.

Figure 4:
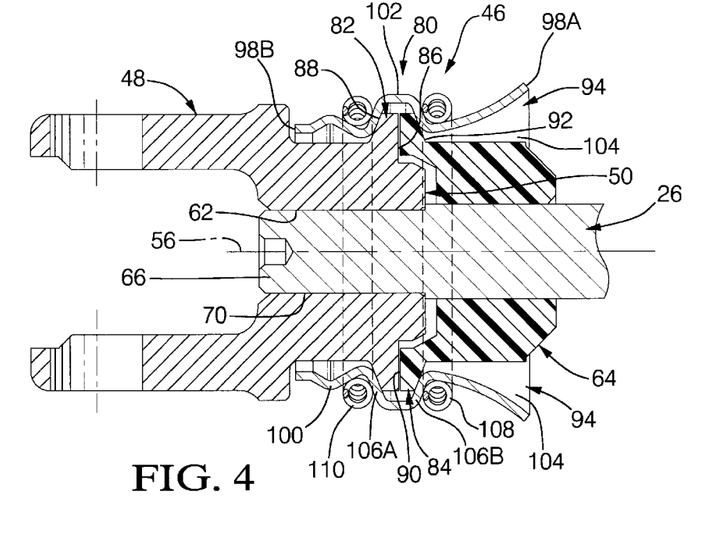
FIG. 4 is a sectional view taken generally along the plane indicated by lines 4—4 in FIG. 3.

In the closed positions of the clamp jaws 94, the side walls 106A, 106B and the frustoconical shoulders 88, 92 cooperate in converting radial inward thrust induced by the annular springs 108, 110 into linear thrust in the direction of the centerline 56 of the shaft coupling which forces the annular first and second flanges 82, 84 toward each other. The height and depth dimensions of the plug 50 and the socket 72, respectively, are calculated to assure that the linear thrust induced by the annular springs 108, 110 maintains zero angular lash between the yoke 48 and the adapter 64 by maintaining the sides 58A, 58B of the plug wedged tightly between the sides 74A, 74B of the socket. Similarly, the magnitude of the angle θ is calculated to prevent contact between the longitudinal edges 96A, 96B of adjacent ones of the clamp jaws 94 in the closed positions of the latter so that the clamp jaws continuously clamp together the annular first and second flanges with zero lash in the direction of the centerline 56 of the shaft coupling 46.

Figure 5A:
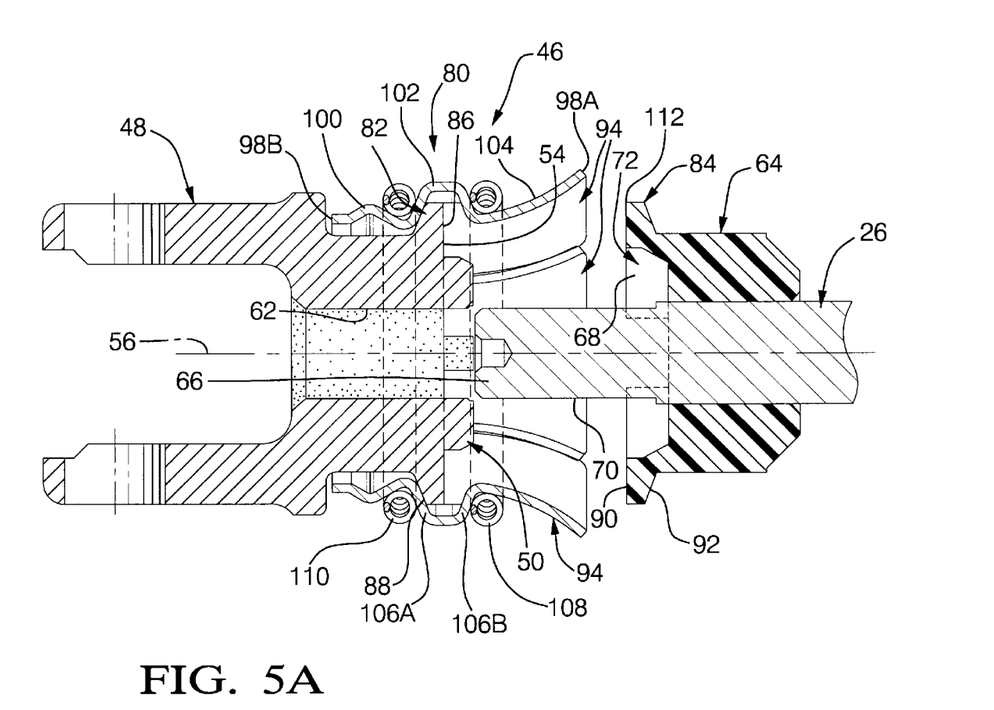
FIGS. 5A–5B are similar to FIG. 4 but showing elements of the shaft coupling according to this invention in different relative positions.
Figure 5B:
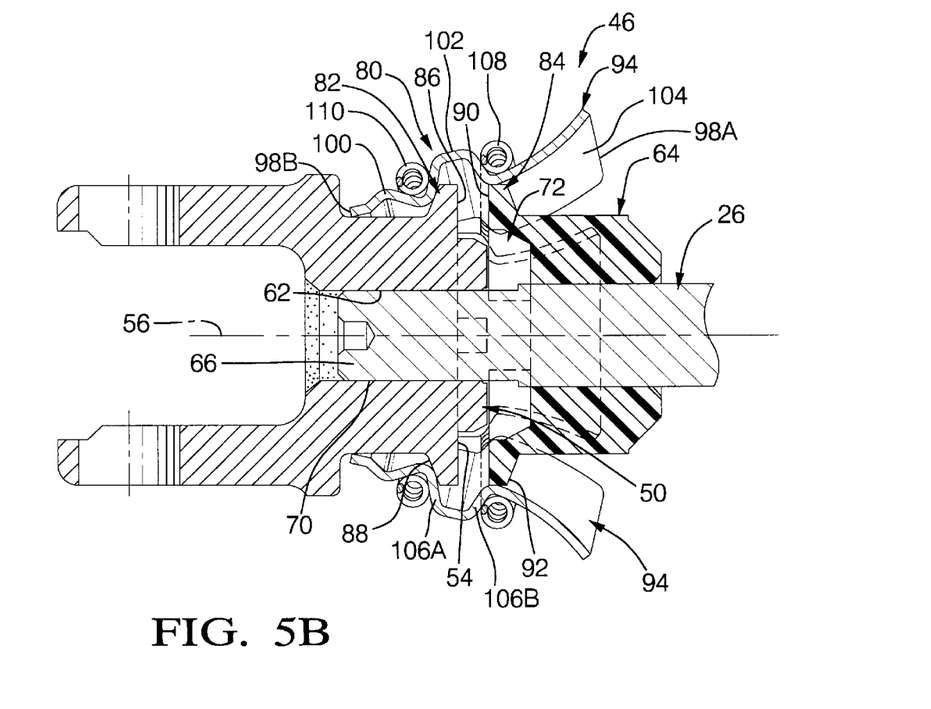
Figure 6:
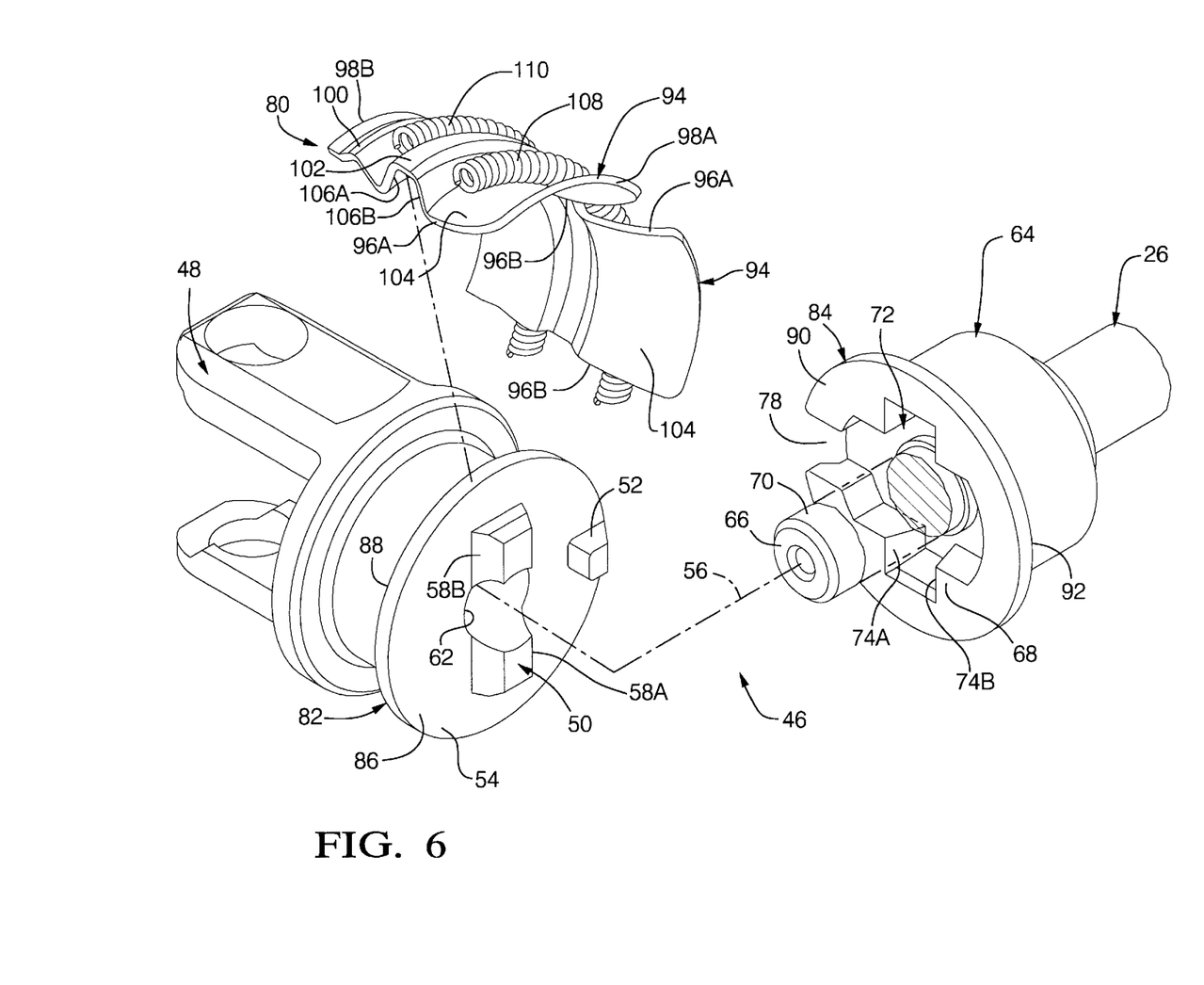
FIG. 6 is an exploded perspective view of the shaft coupling according to this invention.

Referring to FIGS. 1, 5A and 5B, the shaft coupling 46 is completed in quick-connect fashion when the intermediate steering shaft 28 is installed between the steering shaft 16 and the steering gear input shaft 26. Before completion obtains, FIG. 5A, the annular springs 108, 110 bias the clamp jaws 94 to their closed positions around only the annular first flange 82 on the yoke 48. To initiate completion of the shaft coupling 46, the cylindrical pilot 70 is inserted in the bore 62 in the yoke and the yoke is advanced by linear translation toward the adapter 64. The annular second flange 84 on the adapter 64, at a peripheral edge 112 thereof, FIG. 5A, engages the flared lips 104 on the clamp jaws 94 simultaneously and, with continued linear translation of the yoke toward the adapter, pivots the clamp jaws about fulcrums defined at their lateral edges 98B from their closed positions, FIG. 5A, to open positions, FIG. 5B, in which the second lateral undulations 102 of the clamp jaws are open to entry of the annular second flange 84.

With the clamp jaws 94 in their open positions, linear translation of the yoke 48 toward the adapter continues until the plug 50 wedges tightly in the socket 72. Concurrently, the annular springs 108, 110 pivot the clamp jaws 94 from their open positions back to their closed positions in which dislodgment of the yoke 48 from the adapter 64 is foreclosed and the two are coupled for unitary rotation with zero angular lash and zero lash in the direction of the centerline 56 as described above.

The height of the orientation lug 52 perpendicular to the end wall 54 of the yoke 48 corresponds to the linear gap between the annular first and second flanges 82, 84 in the open positions of the clamp jaws 94, FIG. 5B. In the event that the plug 50 is not angularly aligned with the socket 72 and the orientation lug 52, consequently, is not aligned with the orientation slot 78, the lug 52 seats against the end wall 68 of the adapter 64 and blocks relative converging linear translation between the yoke 48 and the adapted 64 with the clamp jaws in their open positions until the orientation lug achieves alignment with the orientation slot.

Figure 7:
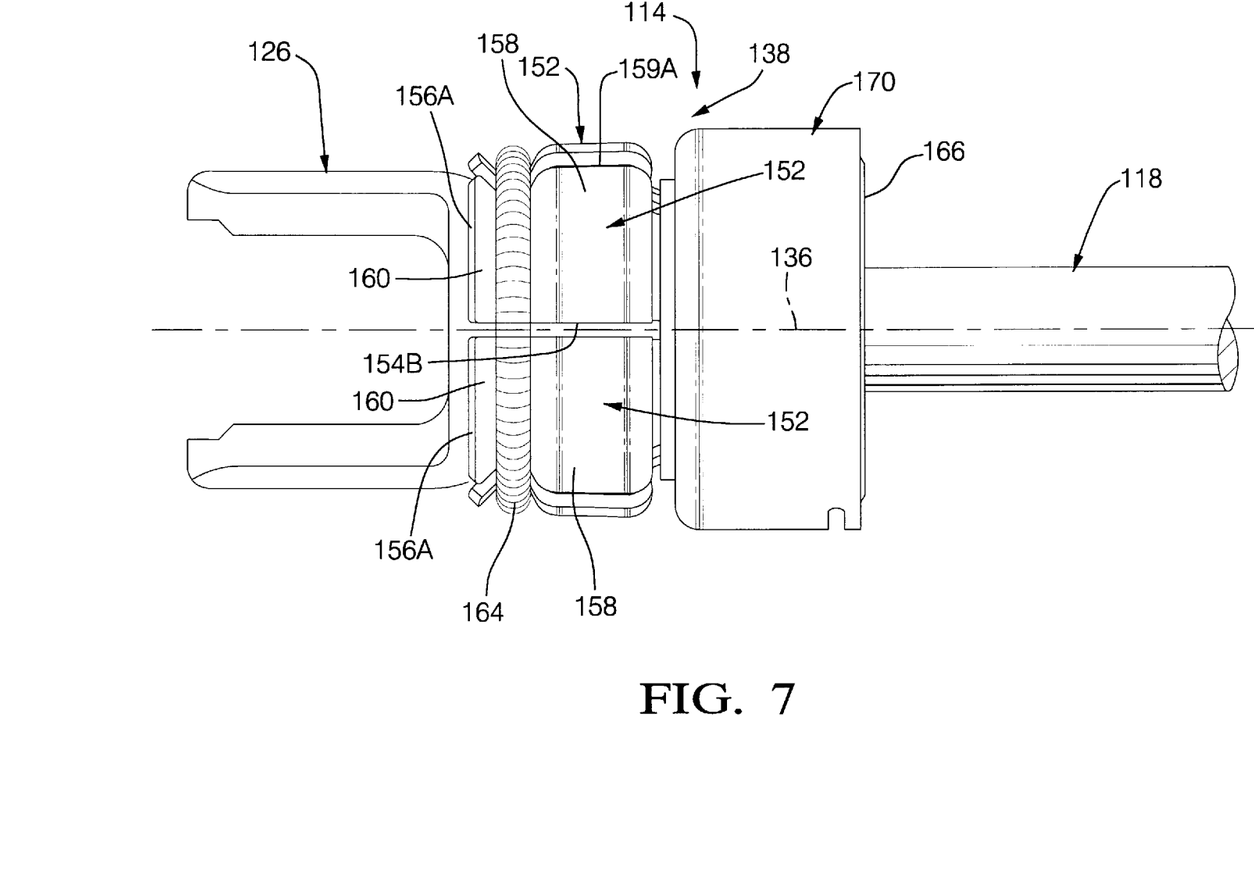
FIG. 7 is similar to FIG. 2 but illustrating a modified shaft coupling according to this invention.
Figure 8:
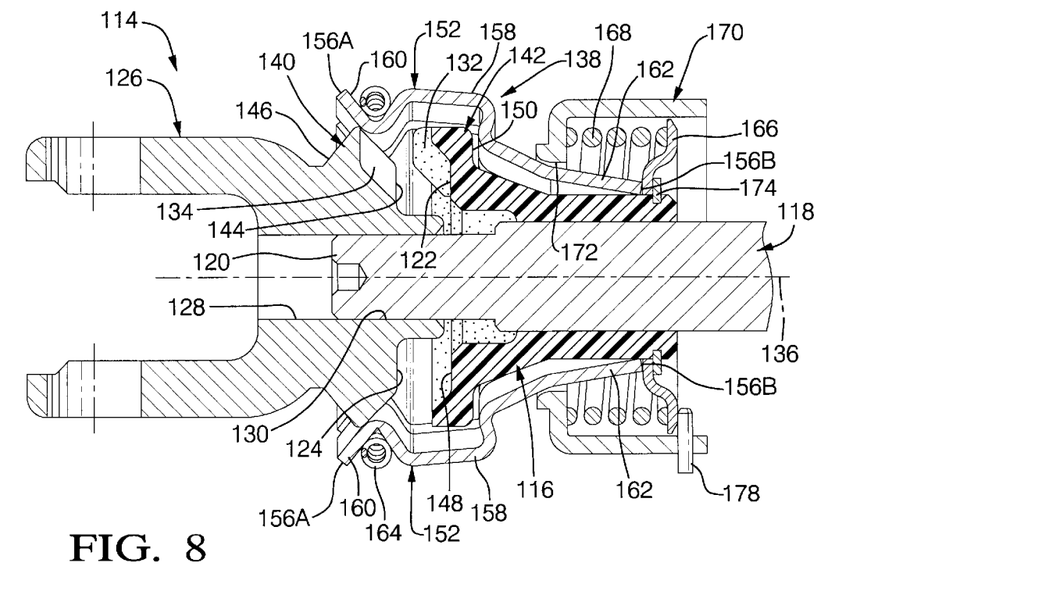
FIG. 8 is a broken-away view of the modified shaft coupling according to this invention illustrated in FIG. 7.
Figure 9:
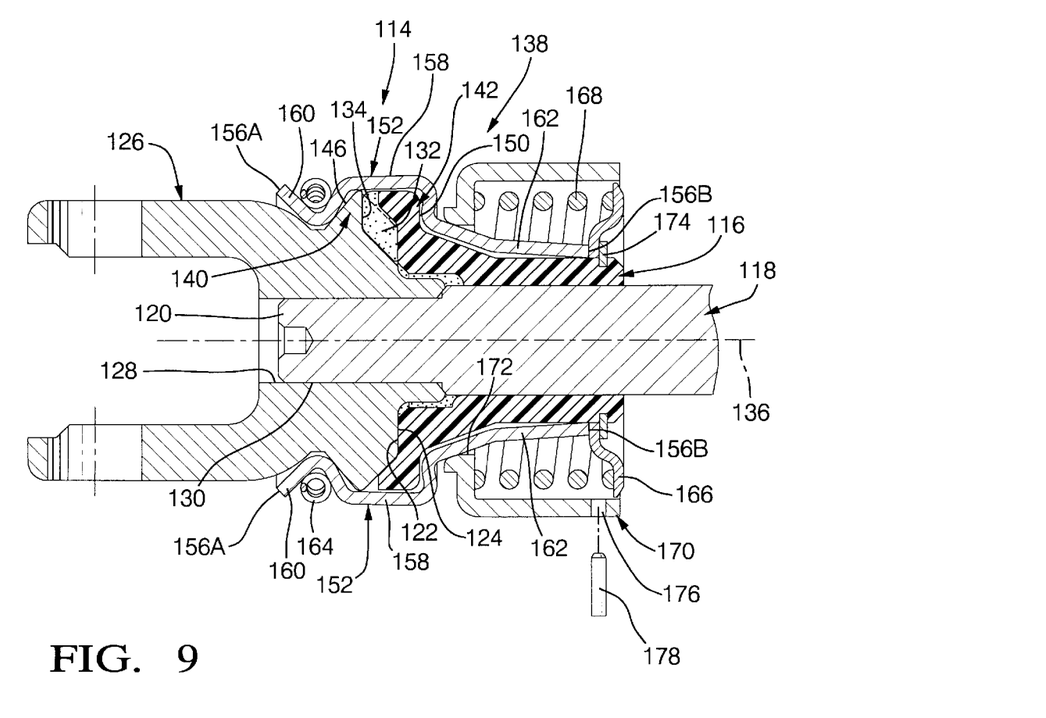
FIG. 9 is similar to FIG. 8 but showing elements of the modified shaft coupling according to this invention in different relative positions.

Referring to FIGS. 7–9, a modified shaft coupling 114 according to this invention includes an adapter 116 rigidly attached to a steering gear input shaft 118 inboard of a distal end 120 of the latter. An end wall 122, FIGS. 8–9, of the adapter 116 faces an end wall 124 of a yoke 126 having a cylindrical bore 128 therethrough. A cylindrical pilot 130 on the steering gear input shaft 118 between the distal end 120 of the shaft and the plane of the end wall 122 of the adapter 116 is closely received in the bore 120 in the yoke. A plug 132 on the end wall 122 of the adapter 116 is seated in a socket 134 in the end wall 124 of the yoke and cooperates therewith in coupling together the yoke 126 and the steering gear input shaft 118 for unitary rotation with zero angular last therebetween about a longitudinal centerline 136 of the modified shaft coupling 114.

A clamp 138 of the modified shaft coupling 114 which prevents dislodgment of the plug 132 from the socket 134 includes an annular first flange 140 on the yoke 126 and an annular second flange 142 on the adapter 116. The first flange 140 has a flat face 144 in the plane of end wall 124 and a frustoconical shoulder 146. The second flange 142 has a flat face 148 in the plane of end wall 122 facing the flat face 144 on the first flange 140 and an annular shoulder 150 facing in the opposite direction from the frustoconical shoulder 146 on the first flange in a plane perpendicular to the longitudinal centerline 136 of the modified shaft coupling.

The clamp 138 further includes a plurality of identical clamp jaws 152 arrayed symmetrically around the annular first and the annular second flanges 140, 142. Each clamp jaw 152 is arc-shaped in lateral cross section and includes a pair of longitudinal edges 154A, 154B, a pair of lateral edges 156A, 156B, a lateral undulation 158, an outwardly flared lip 160 between the lateral undulation and the lateral edge 156A, and a skirt 162 between the undulation 158 and the lateral edge 156B. The clamp jaws 152 cover equal angular segments of the circumferences of the juxtaposed annular flanges 140, 142. The lateral undulation 158 of each clamp jaw has a pair of side walls inclined to generally match the inclinations of the oppositely facing frustoconical and annular shoulders 146, 150, respectively, on the annular first and the annular second flanges 140, 142, FIG. 9.

An annular spring 164 stretched around all of the clamp jaws 152 in a circumferential trough defined at the intersection between the flared lip 160 and the lateral undulation 158 of each clamp jaw biases each of the clamp jaws radially inward to a closed position, FIGS. 7 and 9, in which the side walls of the lateral undulation bear against the frustoconical and annular shoulders 146, 150, respectively, on the annular flanges. The lateral edge 156B of each of the clamp jaws 152 bears against an annular spring seat 166. A coil spring 168 around the clamp jaws 152 bears at one end against the spring seat 166 and at the other end against a shoulder on a tubular sleeve 170 around the spring. The spring 168 biases the tubular sleeve to an extended position of the latter in which a circular inner edge 172 on the tubular sleeve is wedged against the skirts 162 of the clamp jaws 152 for positive retention of the clamp jaws in their closed positions. The force of the spring 168 on the spring seat 166 is reacted to the adapter 116 by a retaining ring 174 on the adapted bearing flush against the spring seat.

As seen best in FIG. 8, the tubular sleeve 170 has a retracted position on the adapter 116 in which an aperture 176 in the sleeve is located behind the spring seat 166, i.e., on the opposite side of the spring seat from the coil spring 168. In that position of the tubular sleeve, the coil spring 168 is substantially fully compressed and the circular inner edge 172 of the tubular sleeve is separated from the skirts 162 of the clamp jaws 152. A schematically represented pin 178 in the aperture 176 in the tubular sleeve cooperates with the spring seat 166 in retaining the tubular sleeve in its retracted position.

With the tubular sleeve 170 retained in its retracted position by the pin 178 and the clamp jaws 152 biased to their closed positions by the spring 164 around only the annular flange 142, the modified shaft coupling 114 is completed in quick-connect fashion by inserting the cylindrical pilot 130 into the bore 128 in the yoke and advancing the yoke by linear translation toward the adapter 116. The annular flange 140 on the yoke, at a peripheral edge thereof, engages the flared lips 160 on the clamp jaws 152 simultaneously and, with continued linear translation of the yoke toward the adapter, pivots the clamp jaws about fulcrums defined at their lateral edges 156B from their closed positions to open positions, FIG. 8, in which the lateral undulations 158 of the clamp jaws are open to entry of the annular flange 140. Clearance between the skirts 162 and the circular edge 172 on the tubular sleeve 170 accommodates pivotal movement of the clamp jaws from their closed to their open positions.

With the clamp jaws 152 in their open positions, linear translation of the yoke 126 toward the adapter continues until the plug 132 wedges tightly in the socket 134. Concurrently, the annular spring 164 pivots the clamp jaws 152 from their open positions back to their closed positions in which dislodgment of the yoke 126 from the adapter 116 is foreclosed and the two are coupled for unitary rotation with zero angular and linear lash. When the pin 178 is then removed from the aperture 176 in the tubular sleeve 170, the spring 168 thrusts the tubular sleeve from its retracted position to a position in which the circular edge 172 is wedged against the skirts 162 of the clamp jaws to positively retain the clamp jaws in their closed positions.

We claim:

1. A shaft coupling between a first shaft and a second shaft comprising:

a socket in an end of one of said first shaft and said second shaft, a plug on an end of the other of said first shaft and said second shaft disposed in said socket and cooperating therewith in coupling said first shaft and said second shaft for unitary rotation about a longitudinal centerline of said shaft coupling, an annular first flange on said first shaft, an annular second flange on said second shaft, and a clamp means on said first shaft and on said second shaft operable in quick-connect fashion when said first shaft and said second shaft are advanced in relative linear translation toward each other to clamp together said first and said second flanges in the direction of said longitudinal centerline of said shaft coupling to prevent dislodgment of said plug from said socket, said clamp means including jaw means yieldable elastically to permit said relative translation and to effect such clamping together.

2. The shaft coupling recited in claim 1 wherein said clamp means comprises:

a frustoconical shoulder on said annular first flange, a frustoconical shoulder on said annular second flange facing in the opposite direction from said frustoconical shoulder on said annular first flange, a plurality of clamp jaws arrayed evenly around the circumferences of said annular first flange and said annular second flange each supported on said first shaft for pivotal movement between a closed position and an open position, a lateral undulation on each of said plurality of clamp jaws having a pair of opposite side walls engageable on respective ones of said oppositely facing frustoconical shoulders on said annular first flange and said annular second flange in said closed positions of said clamp jaws, a spring means biasing each of said clamp jaws toward its closed position, and a flared lip on each of said clamp jaws engageable by a peripheral edge of said annular second flange when said first shaft and said second shaft are advanced in relative linear translation toward each other to pivot each of said clamp jaws from its closed position to its open position permitting entry of said annular second flange into said lateral undulation of each of said clamp jaws.

3. The shaft coupling recited in claim 2 wherein said spring means comprises:

an annular first spring stretched around all of said clamp jaws on a first side of said lateral undulation in each clamp jaw, and an annular second spring stretched around all of said clamp jaws on a second side of said lateral undulation in each clamp jaw.

4. The shaft coupling recited in claim 3 further comprising:

an orientation lug on one of said first shaft and said second shaft, and an orientation slot on the other of said first shaft and said second shaft cooperating with said orientation lug to block converging relative linear translation between said first and said second shafts with each of said clamp jaws in its open position unless said plug is aligned with said socket.

5. The shaft coupling recited in claim 1 wherein said clamp means comprises:

a frustoconical shoulder on said annular first flange, an annular shoulder on said annular second flange facing in the opposite direction from said frustoconical shoulder on said annular first flange, a plurality of clamp jaws arrayed evenly around the circumferences of said annular first flange and said annular second flange each supported on said second shaft for pivotal movement between a closed position and an open position, a lateral undulation on each of said plurality of clamp jaws having a pair of opposite side walls engageable on respective ones of said oppositely facing frustoconical shoulder and said annular shoulder on said annular first flange and said annular second flange in said closed position of said clamp jaws, a spring means biasing each of said clamp jaws toward said closed position, and a flared lip on each of said clamp jaws engageable by a peripheral edge of said annular first flange when said first shaft and said second shaft are advanced in relative linear translation toward each other to pivot each of said clamp jaws from said closed position to said open position permitting entry of said annular first flange into said lateral undulation of each of said clamp jaws.

6. The shaft coupling recited in claim 5 wherein said spring means comprises:

an annular spring stretched around all of said clamp jaws and seated in a trough of each of said clamp jaws defined between said flared lip and said lateral undulation thereof.

7. The shaft coupling recited in claim 6 further comprising:

a skirt on each of said clamp jaws on the opposite side of said lateral undulation thereof from said flared lip thereof, a tubular sleeve supported on said second shaft around each of said skirts of said clamp jaws for linear translation between a retracted position and an extended position, a spring means biasing said tubular sleeve from said retracted position toward said extended position, and a circular edge on said tubular sleeve remote from said skirts on said clamp jaws in said retracted position of said tubular sleeve so that said clamp jaws are pivotable from said closed positions to said open positions and engageable on said skirts of said clamp jaws in said closed positions of said clamp jaws and in said extended position of said tubular sleeve for positive retention of said clamp jaws in said closed positions thereof.

8. The shaft coupling recited in claim 7 further comprising:

a retention means on said second shaft operative to retain said tubular sleeve in said retracted position and selectively operable to release said tubular sleeve for linear translation to said extended position.

* * * * *